July 22, 1941.  A. HENDERSON  2,250,020
MOLDING APPARATUS
Filed Nov. 7, 1938  5 Sheets-Sheet 3
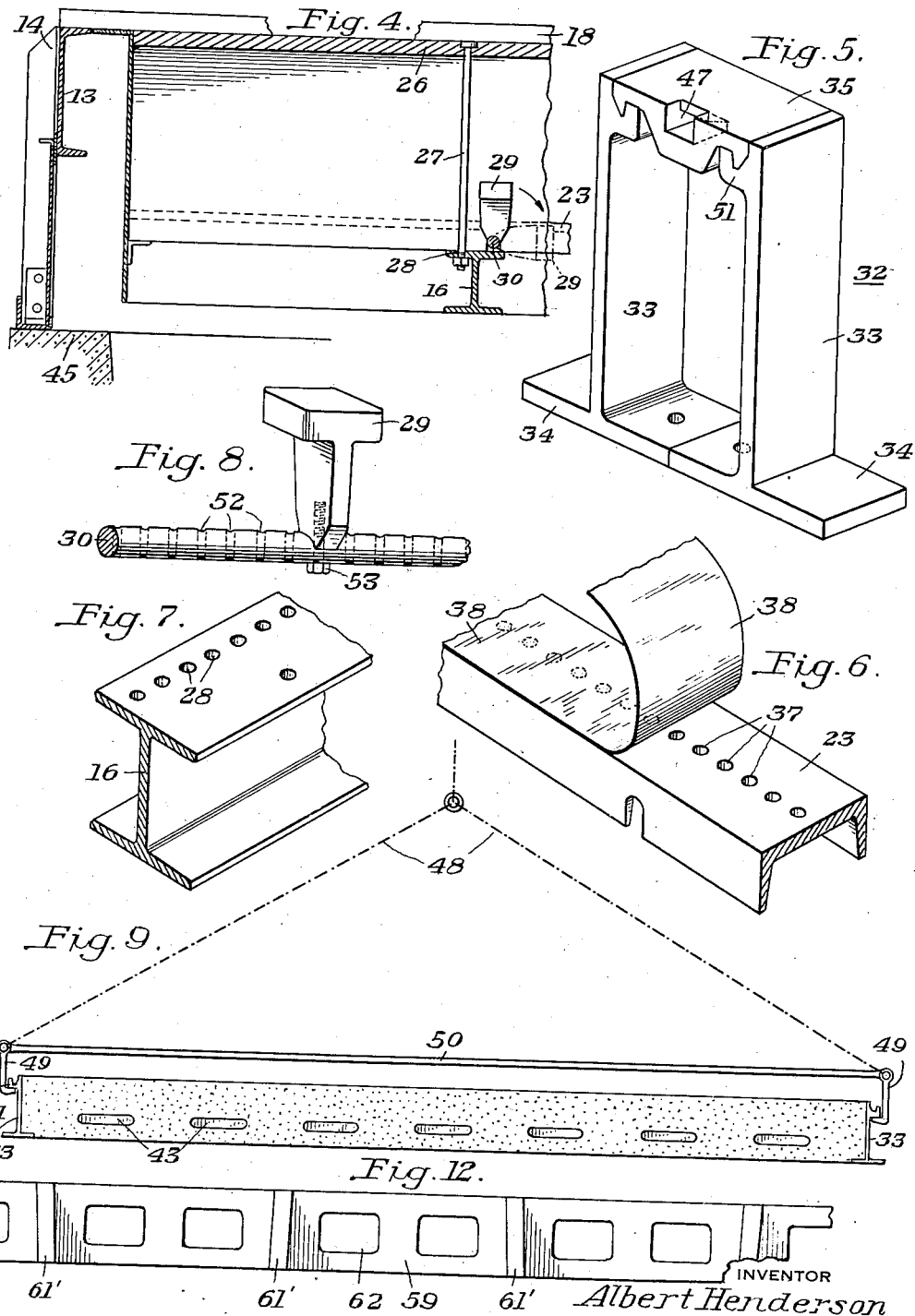

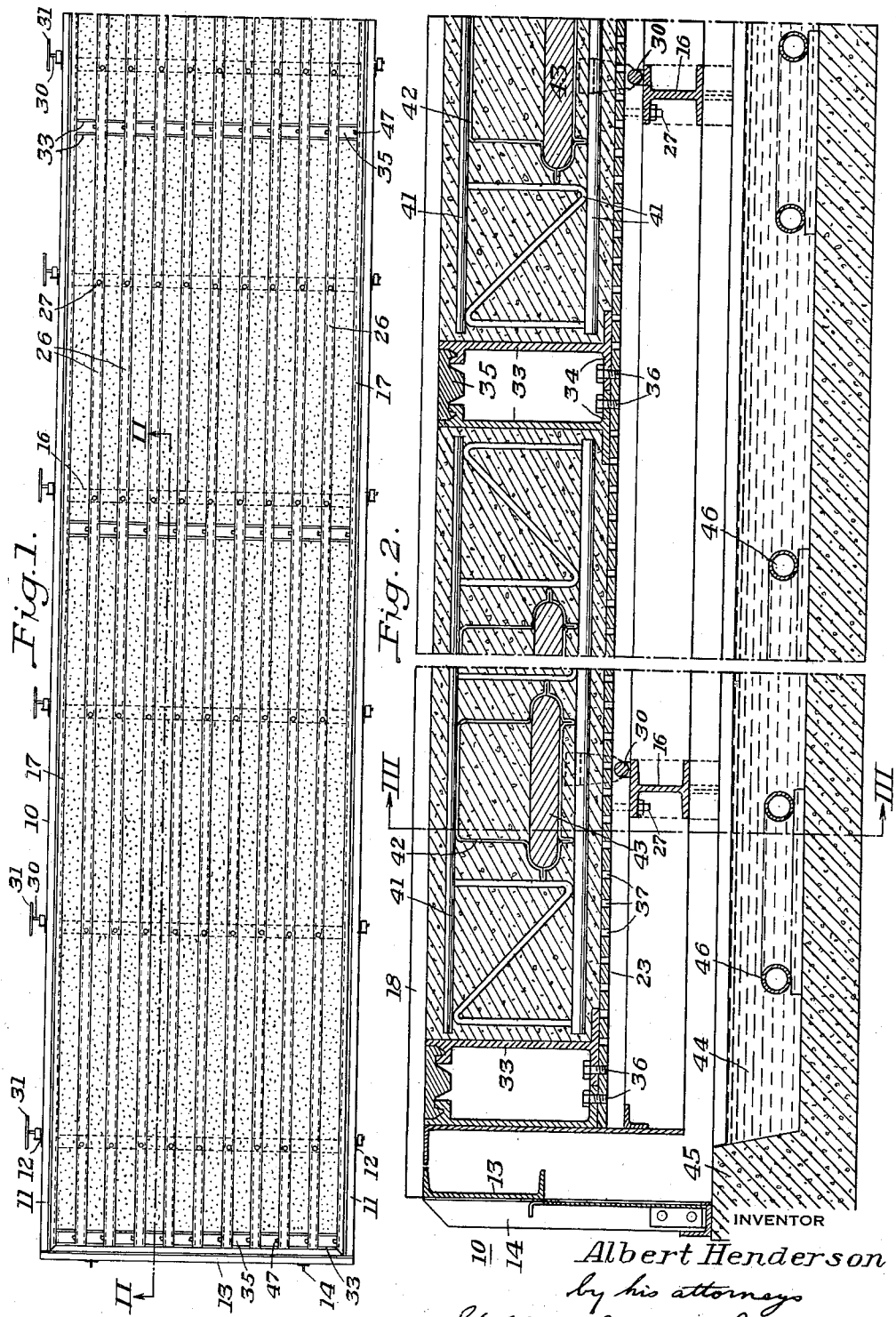
July 22, 1941. A. HENDERSON 2,250,020
MOLDING APPARATUS
Filed Nov. 7, 1938 5 Sheets-Sheet 1
INVENTOR
Albert Henderson
by his attorneys
Stebbins, Blenko & Parmelee

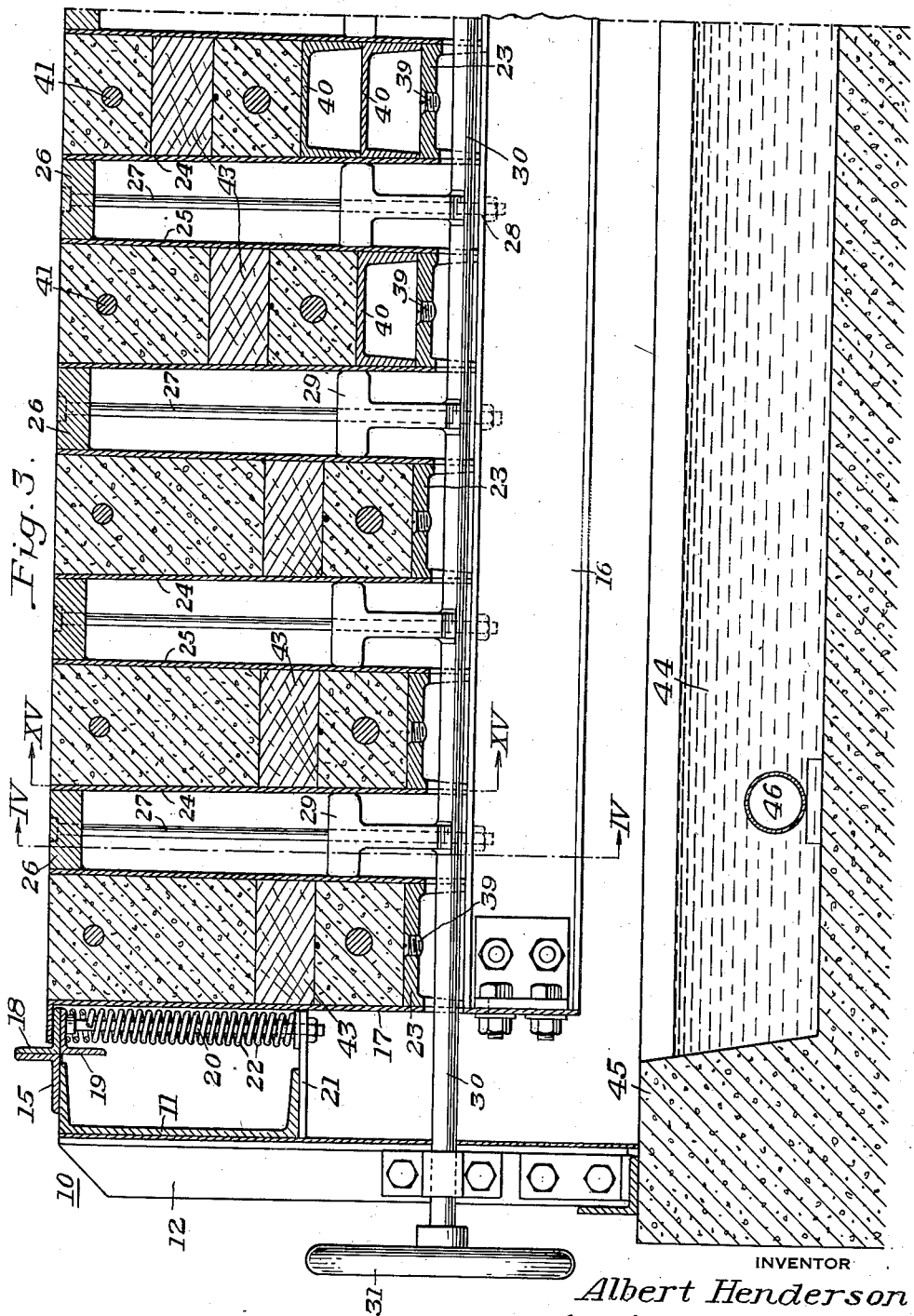

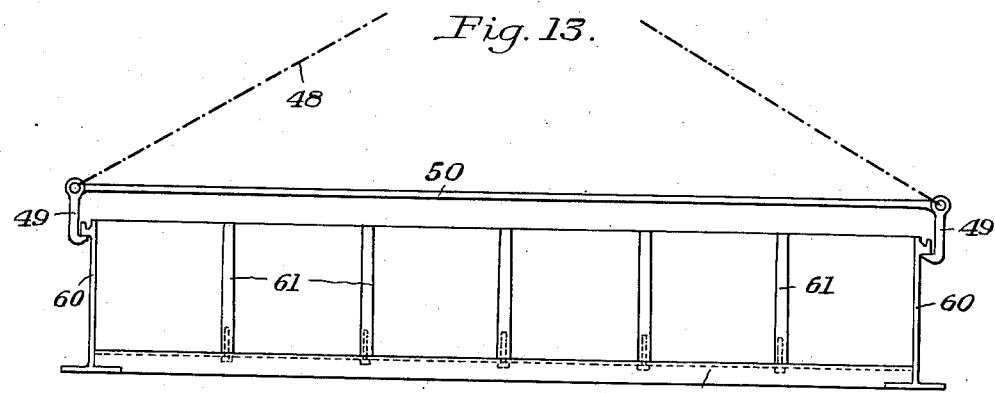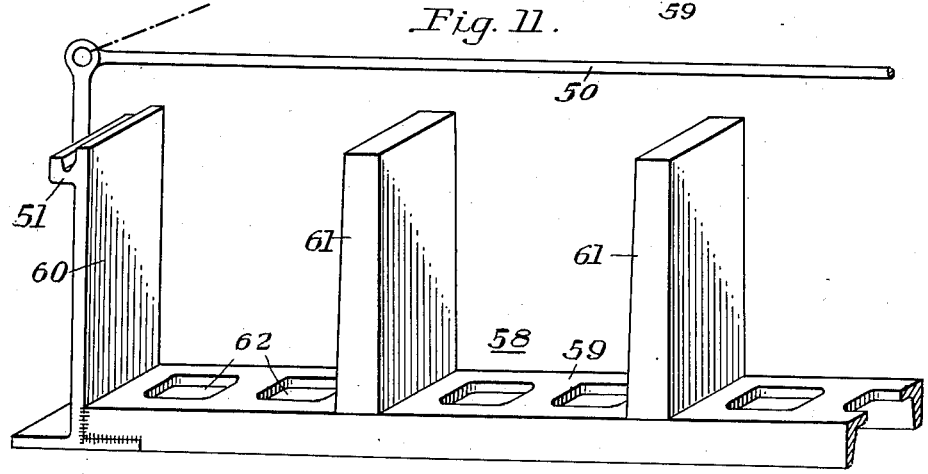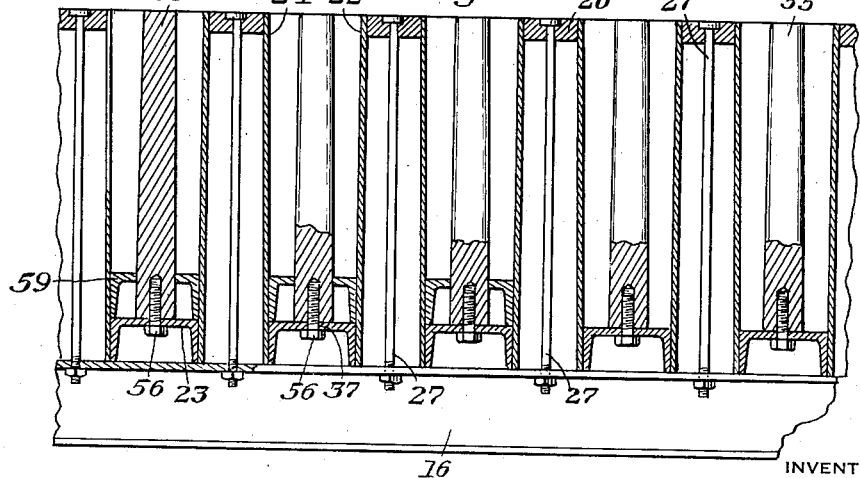

July 22, 1941.  A. HENDERSON  2,250,020
MOLDING APPARATUS
Filed Nov. 7, 1938  5 Sheets-Sheet 5
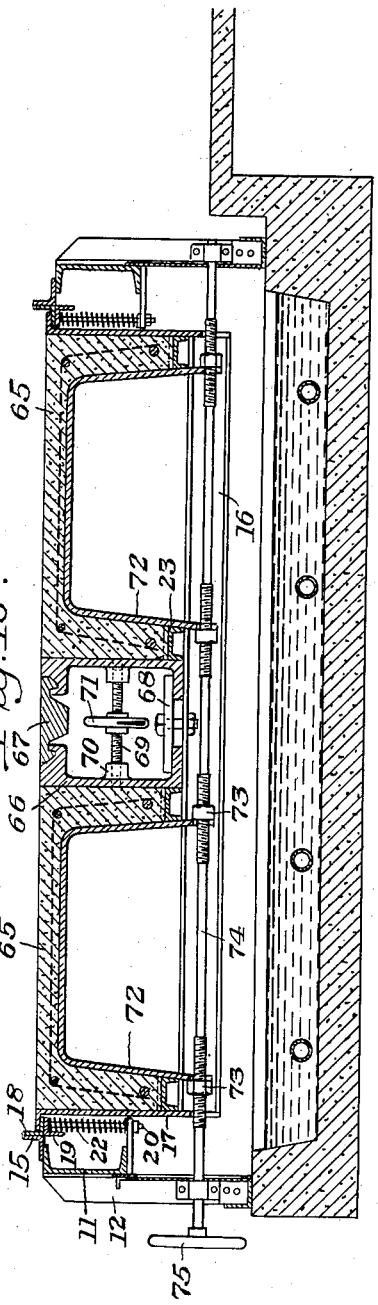
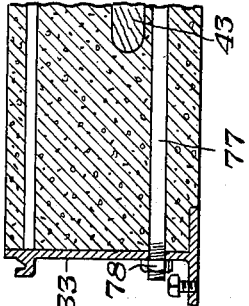
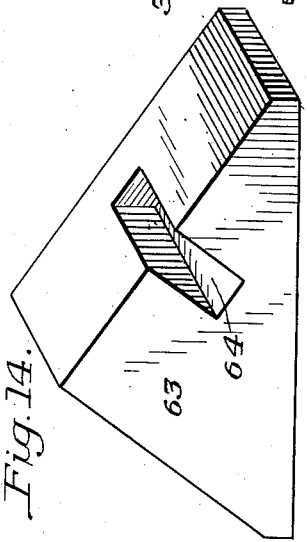
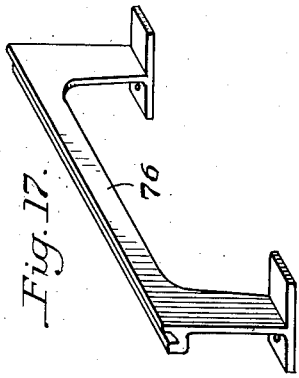
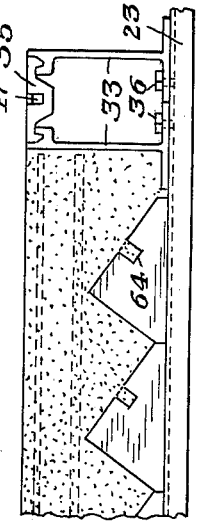
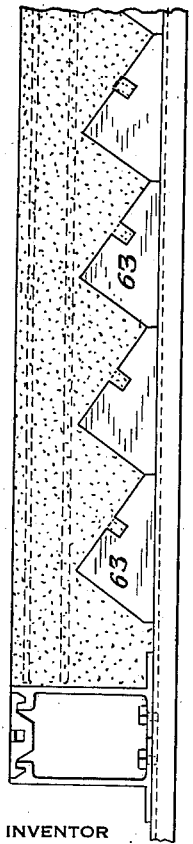
INVENTOR
Albert Henderson
by his attorneys
Stebbins, Blenko & Parmelee Patented July 22, 1941

2,250,020

UNITED STATES PATENT OFFICE 2,250,020

MOLDING APPARATUS

Albert Henderson, Pittsburgh, Pa., assignor to William P. Witherow, Pittsburgh, Pa.

Application November 7, 1938, Serial No. 239,255

9 Claims. (Cl. 25—121)

This invention relates to apparatus for the manufacture of cementitious articles such as joists, having various lengths.

Certain molded cementitious articles such as precast concrete joists are used in a wide variety of lengths. If it is attempted to make various lengths of joists in a mold having a length of the maximum size of joist required, it is evident that a portion of the apparatus remains idle when making short joists. I have invented a novel form of molding apparatus particularly adapted for making precast joists although useful for making other articles as well, wherein the mold chambers have side walls and bottom plates of indefinite length and are provided with end walls movable to various positions along the bottom plates, whereby joists of any desired length may be made with a high degree of economy, the various lengths of joists being provided merely by shifting the end walls of the molds. The apparatus of my invention contemplates other novel features such as the provision of a supporting frame having a cradle resiliently mounted therein and adapted to support the mold chambers. I also provide means for spacing the side walls of adjacent mold chambers apart to facilitate contact by a heating medium such as steam. I have provided manually operable means for releasing the side walls of the mold so that sufficient clearance is provided between the walls and the molded articles to facilitate removal of the latter. A preferred embodiment of the invention is illustrated in the accompanying drawings to which reference will be made during the course of the following detailed description. In the drawings:

Fig. 1 is a partial plan;

Fig. 2 is a sectional view taken substantially along line II—II of Fig. 1;

Fig. 3 is a sectional view taken substantially along line III—III of Fig. 2;

Fig. 4 is a sectional view taken substantially along line IV—IV of Fig. 3;

Fig. 5 is a perspective view of a set of end walls for two adjacent mold chambers;

Fig. 6 is a perspective view of a bottom plate of a mold chamber;

Fig. 7 is a partial perspective view of one of a plurality of beams on which the bottom plates and side walls of the mold chambers are carried;

Fig. 8 is a partial perspective view illustrating one of the spacers for normally holding the side walls of adjacent mold chambers in proper relative positions;

Fig. 9 is an elevation illustrating the removal of one of the precast joists from a mold chamber;

Fig. 10 is a view similar to Fig. 3 showing a modification;

Fig. 11 is a perspective view of a pallet member adapted to be used in mold chambers such as those shown in Fig. 10;

Fig. 12 is a partial plan view of a modified pallet member;

Fig. 13 is an elevation showing the manner in which the pallet member and articles molded thereon may be removed from a mold chamber;

Fig. 14 is a perspective view of a filler block which I employ for molding articles of special shape;

Fig. 15 is a partial side elevation illustrating the use of the filler blocks of Fig. 14, such as would be projected on the plane indicated by the line XV—XV of Fig. 3;

Fig. 16 is a transverse sectional view similar to Fig. 3 showing a modification adapted for the manufacture of channel section slabs;

Fig. 17 is a perspective view of an end wall for the mold chambers of the structure of Fig. 16; and Fig. 18 illustrates a further modification whereby the reinforcing members disposed in the mold chamber may be subjected to stress prior to the pouring of a cementitious mix therearound.

Referring now in detail to the drawings, the molding apparatus of the invention is supported in a frame 10 composed of longitudinal channels 11 carried on spaced posts 12 and transverse channels 13 carried on similar posts 14. Angles 15 extend along the channels 11 and 13 and provide bearing surfaces adapted to confine a cradle resiliently supported within the frame. The cradle is composed of transverse beams 16 spaced along the apparatus and side walls 17 secured thereto. Angles 18 and 19 extend along the upper edges of the side walls 17 and are secured thereto, providing bearing surfaces cooperating with those afforded by the angles 15. Guide bolts 20 extend downwardly from the angles 18 and 19 through brackets 21 secured to the channels 11. Compression springs 22 surrounding the bolts 20 resiliently support the cradle comprising the beams 16, side walls 17 and other elements to be described shortly.

Channels 23 extend the length of the apparatus, being disposed on the beams 16 in spaced relation. The channels 23 constitute the bottom plates of mold chambers having side walls 24 and 25. The side walls 24 and 25 are secured to longitudinal bars 26 adjacent their upper edges. Tie bolts 27 extend downwardly from the bars 26 through holes 28 formed in the upper flange of the beams 16. The side walls 24 and 25 are not secured to the channels 23 but are held in engagement therewith by spacers 29 carried on cross shafts 30. The distance between the upper edges of the side plates 24 and 25 is slightly greater than the width of the channels 23 so that the side walls 24 have a slight draft. When the shafts 30 are turned by means of hand wheels 31, so that the spacers move to the position shown in dotted lines on Fig. 4, the lower edges of the side walls 24 and 25 are freed for slight movement away from the channels 23. The spacers 29 are shown in Fig. 3 as welded to the shafts 30.

End wall assemblies, such as that shown at 32 in Fig. 5, are adapted to be positioned between the side walls 24 and 25 and are adjustable along the channels 23. Each assembly comprises a pair of end walls or partitions 33, each including a vertical wall portion mounted on a base or foot portion 34, and a lid 35 connecting the upper edges of the end walls. The end wall assemblies are secured in any desired position along the channels 23 by screws 36. To permit adjustment of the end wall assemblies to the various positions, the channels 23 are provided with holes 37 spaced therealong. When the end wall assemblies have been properly positioned to form mold chambers of the desired lengths with the side walls 17, 24 and 25 and the bottom plates 23, the holes 37 in the latter between adjacent end wall assemblies may be closed either by a strip of tar paper 38 as shown in Fig. 6, or by screws 39 as shown in Fig. 3.

In order to make joists of different depths, I provide filler channels 40 as shown in Fig. 3, adapted to be disposed on the bottom plates 23 in sufficient number to provide mold chambers of the desired depth. When the filler channels 40 have been disposed as desired and the side plates 24 and 25 pressed against the bottom plates 23 by upward movement of the spacer 29, the mold chambers of various lengths are adapted to receive cementitious material. The apparatus may be extended to any desired length, for example, 100' or more, and the mold chambers are preferably filled by a traveling hopper or mixer having wheels engaging the channels 11.

A reinforcing assembly 41 is placed in each mold chamber and supported therein by any convenient spacer or the like while concrete or other cementitious mix is being poured. The reinforcing assembly preferably includes a plurality of supports 42 for filler blocks 43. The supports 42 may conveniently be welded to the reinforcing assembly. The function of the filler blocks 43 is to form slots in the joists.

After the mold chambers have been filled, the poured concrete is subjected to heat to expedite curing. A water bath 44 may conveniently be formed in a foundation 45 supporting the posts 12 and 13 and provided with steam heating pipes 46. Because of the spaced relation of the side walls 24 and 25 of adjacent mold chambers, steam evolved from the water bath 44 has direct access to the mold walls.

After the joists have been cured sufficiently to be strong enough to support their own weight, the shafts 30 are rotated to swing the spacers 29 downwardly as shown in Fig. 4, thus providing a slight clearance for separation of the lower edges of the side walls 24 and 25 from the bottom plates 23. The covers 35 of the end wall assemblies may then be removed, being recessed as at 47 to facilitate such removal. The screws 36 are then taken out. A lifting rig 48 shown in Fig. 9 and including hooks 49 and a spreader 50 is then employed to lift the joists from the mold chambers. It will be observed that the hooks 49 engage under offset shoulders 51 formed in the end walls 33. After the formed articles have been removed from the mold, additional end wall assemblies may be positioned therein and the casting process repeated.

Although precast joists are usually made in a standard width, it may be desirable to make them in different widths. I provide means for so doing. Each beam 16 is provided with a row of holes 28 as shown in Fig. 7, whereby the tie bolts 27, the side walls 24 and 25 and the longitudinal bars 26 may be adjusted to various positions transversely of the cradle. Instead of the spacers being welded to the shafts 30, the latter may be provided with spaced holes 52 and the spacers 29 secured to the shafts by screws 53 passing through these holes.

Although the apparatus described hereinabove is particularly adapted for the manufacture of precast joists, it may also be utilized for the manufacture of other molded articles, such as blocks. As shown in Fig. 10, cores 55 may be secured to the bottom plates 23 by screws 56 extending through holes 37. Pallet assemblies, such as that shown at 58 in Fig. 11, including a bottom plate 59, end walls 60, and intermediate cross walls 61, may be disposed in the mold chambers defined by the side walls 24 and 25. The bottom plate 59 has holes 62 in alignment with the cores 55. The end wall 60 corresponds to the end wall 33 of the assembly 32 shown in Fig. 5. The intermediate cross walls 61 are tapered to facilitate removal of the blocks from the pallet. In a modified form of pallet shown in Fig. 12, the intermediate cross walls 61' are not disposed precisely at right angles to the length of the pallet assembly but at an oblique angle as shown in Fig. 12 whereby a block formed between two adjacent cross walls may easily be pushed out horizontally in one direction while the adjacent blocks may be pushed out in the opposite direction.

Fig. 13 illustrates the removal of a plurality of blocks on the pallet assembly of Fig. 11.

Fig. 14 illustrates a filler block 63 which I may employ in the mold chambers provided by the apparatus already described in the manner indicated in Fig. 15, in order to mold articles having notches to serve as stringers for steps. The fillers 63 have recesses 64 therein to receive the shanks of bolts which it may be desired to embed in the treads of the stringers being molded. Bolts may conveniently be supported in the recesses 64 by filling the latter with sand and inserting the bolts therein. As shown in the drawings, the filler blocks 63 have the shape of a right triangle in elevation and are positioned on the bottom plate 23 of the mold defined by the latter with the side walls 24 and the end walls 33, with their hypotenuse down and with the vertices of adjacent blocks in contact. The height of the blocks from their hypotenuse is approximately half the depth of the mold. The blocks 63 preferably have a width or thickness equal to that of the mold.

Fig. 16 illustrates apparatus similar in general to that already described except that it is adapted for the molding of precast slabs 65 of channel section. The parts of the apparatus shown in Fig. 16 which are common to that already described are indicated by the same reference numerals. Inner side walls 66 extend longitudinally of the apparatus and are provided with sectional covers 67. The side walls 66 are of generally channel section and are held on the beams 16 by hold-down plates 68. Screw shafts 69 spaced along the length of the side walls cooperate with threaded bosses 70 formed thereon and are provided with hand wheels 71. The latter may be manipulated on lifting the covers 67 to permit the side walls 66 to yield inwardly, thereby facilitating removal of the slabs after casting. The lower surfaces of the slabs are formed by elongated cores 72 extending upwardly between spaced bottom plates 23. The lower edges of the cores 72 have nuts 73 welded thereon which cooperate with transverse screw shafts 74. Rotation of the shafts 74 by hand wheel 75 causes retraction of the lower edges of the cores 72, thus further freeing the cast slabs for removal.

The slabs 65 may be made any desired length by suitably positioning end walls 76 which may be adjusted along the bottom plates 23 in the same manner as the assembly shown at 32 in Fig. 5.

Fig. 18 illustrates the use of the apparatus shown in Figs. 1 through 10 for the manufacture of joists having the reinforcement thereof prestressed. As indicated in the drawings, a lower reinforcing rod 77 is threaded at its end and passes through holes in the end walls 33. By tightening up nuts 78 threaded on the protruding ends of the reinforcing bar, the latter may be subjected to the desired stress before pouring concrete in the mold chamber.

It will be apparent from the foregoing description that the invention provides a molding apparatus having numerous advantages over such structures as known heretofore. Elongated members of practically any length may be made without leaving any portion of the apparatus idle and the end walls of the mold chambers may be easily moved to form members of different lengths. Removal of the members after casting is facilitated by freeing the side walls of the mold chambers for separation from the sides of the molded articles. While primarily intended for molding joists, the apparatus may also be employed for molding other shapes such as blocks, slabs, etc. A high degree of flexibility in the use of the apparatus is provided by the adjustable positioning of the side walls of the mold chamber and the spacers which normally hold them against the bottom plates.

Although I have illustrated and described but a preferred form of the invention and certain modifications, it will be understood that changes in the construction disclosed may be made without departing from the spirit of the invention or the scope of the appended claims.

I claim:

1. In a molding apparatus, a plurality of spaced bottom plates, side walls cooperating therewith to form mold chambers, and end walls movable along said bottom plate for sub-dividing said mold chambers, said end walls being of inverted T-shape and arranged in spaced pairs with their bottoms abutting each other and resting on said bottom plates.

2. In a molding apparatus, a bottom plate having side walls cooperating therewith and end walls adjustable along said bottom plate, said end walls being arranged in pairs, each having a horizontally extending base portion which is effective to space the end plates apart, and means accessible between the end plates of each pair and extending through their base portions for securing them to said bottom plate.

3. Molding apparatus comprising a plurality of pairs of parallel side walls disposed in spaced relation, bottom plates and longitudinally extending beams alternately disposed between successive pairs of side walls, said side walls being secured to said beams adjacent their upper margins, and the lower margins of said side walls being adapted to engage the sides of the bottom plates flatwise, whereby said side walls are supported independently of the bottom plates, with their lower margins free for movement laterally toward and from said bottom plates.

4. Apparatus as defined in claim 3 characterized by means movable between said bottom plates for forcing said side walls into engagement therewith.

5. In a molding apparatus, a pair of spaced side walls, a member dimensioned to be lowered between said walls and having cores attached thereto, and a pallet member also dimensioned to be lowered between said walls and including a bottom having openings therein adapted to admit said cores, and spaced partition walls secured to said pallet member and extending upwardly between said openings.

6. Molding apparatus comprising a plurality of spaced bottom plates, cross-beams on which said plates rest, a beam extending longitudinally between each pair of adjacent bottom plates and spaced vertically thereabove, means extending upwardly from said cross beams for supporting said longitudinal beams, side walls secured at their upper edges to said longitudinal beams, and means for forcing the lower edges of the side walls into abutment with said bottom plates laterally, said walls being adapted to move laterally away from the bottom plate when free.

7. In a molding apparatus, a bottom plate, side walls cooperating therewith to form a mold chamber, and self-supporting partitions of inverted T-shape movable along said bottom plate for sub-dividing said mold chamber, each partition having an extended foot portion resting on said bottom plate and a vertical wall portion upstanding thereon whereby articles of any desired length may be formed in said mold chamber.

8. In a molding apparatus, a mold comprising a bottom, side and end walls cooperating therewith, each of said end walls being of inverted T-shape and including an extended foot portion resting on the bottom and an upstanding wall portion, said wall portion having a hole adapted to receive the end of a reinforcing member inserted in the mold to be embedded in the article formed therein, and means securing said foot portion to said bottom whereby the end walls provide a reaction for the tensile force applied to said members to prestress them.

9. In a molding apparatus, a plurality of spaced bottom plates, side walls cooperating therewith to form mold chambers, and partitions movable along said bottom plate for sub-dividing said mold chambers, each partition being of inverted T-shape and including a vertical wall portion and a foot portion elongated in the direction perpendicular to the plane of the wall portion whereby the partition is self-supporting when disposed with its foot portion on said bottom plate.

ALBERT HENDERSON.